United States Patent [19]

Cseh et al.

[11] 4,055,559
[45] Oct. 25, 1977

[54] DISAZO PIGMENT CONTAINING AT LEAST 2 CHLORINE ATOMS AND PROCESS FOR THEIR MANUFACTURE

[75] Inventors: Georg Cseh, Arlesheim; Willy Mueller, Riehen, both of Switzerland

[73] Assignee: Ciba-Geigy Corporation, Ardsley, N.Y.

[21] Appl. No.: 620,689

[22] Filed: Oct. 8, 1975

Related U.S. Application Data

[63] Continuation-in-part of Ser. No. 481,284, June 20, 1974, abandoned, which is a continuation of Ser. No. 287,327, Sept. 8, 1972, abandoned.

[30] Foreign Application Priority Data

Sept. 10, 1971 Switzerland .................. 13313/71

[51] Int. Cl.$^2$ ............................................. C09B 33/14
[52] U.S. Cl. ................................. 260/176; 260/140; 260/208; 106/288 Q
[58] Field of Search .............................. 260/176, 177

[56] References Cited

U.S. PATENT DOCUMENTS

| | | | |
|---|---|---|---|
| 1,505,568 | 8/1924 | Laska et al. ...................... | 260/176 X |
| 1,762,022 | 6/1930 | Laska et al. ...................... | 260/176 |
| 2,591,470 | 4/1952 | Schmid et al. ...................... | 260/176 |
| 3,413,279 | 11/1968 | Mueller ............................ | 260/176 |
| 3,513,154 | 5/1970 | Towle et al. ...................... | 260/176 |

FOREIGN PATENT DOCUMENTS

| | | | |
|---|---|---|---|
| 2,244,035 | 3/1973 | Germany ........................... | 260/176 |

*Primary Examiner*—Charles F. Warren
*Attorney, Agent, or Firm*—Vincent J. Cavalieri

[57] ABSTRACT

A disazo pigment of the formula

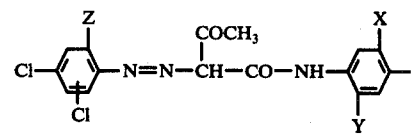

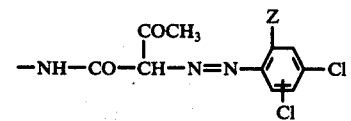

wherein X and Y are hydrogen, chlorine, alkyl of 1 – 4 C-atoms or one of X and Y can be alkoxy of 1 – 4 C-atoms and Z is chlorine or methyl, which is useful for pigmenting high molecular organic material and shows excellent fastness to light and weather.

4 Claims, No Drawings

DISAZO PIGMENT CONTAINING AT LEAST 2 CHLORINE ATOMS AND PROCESS FOR THEIR MANUFACTURE

This is a continuation-in-part application of pending prior application Ser. No. 481,284 filed on June 20, 1974 now abandoned which is a continuation application of the prior application Ser. No. 287,327 filed on Sept. 8, 1972, now withdrawn.

It has been found that new valuable disazo pigments of the formula I

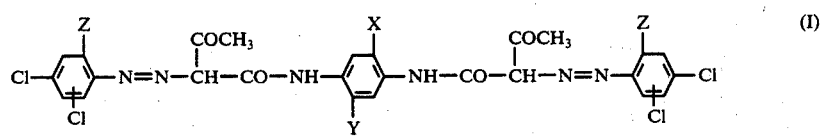

wherein X and Y are hydrogen, chlorine, alkyl of 1 – 4 C-atmos or one of X and Y can be alkoxy of 1 – 4 C-atoms, and Z is chlorine or methyl, are obtained if a diazo or diazoamino compound of an aminobenzene of the formula II

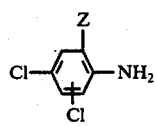

is coupled with a bis-acetoacetyl-p-phenylenediamine of the formula III

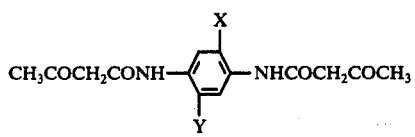

in the molar ratio of 2:1.

Particular interest attaches to disazo pigments of the formula IV

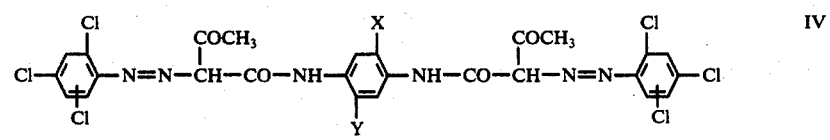

wherein X and Y are hydrogen, chlorine or methyl and one of X and Y also methoxy. Preferred disazo pigments are those of the formulae V and VI

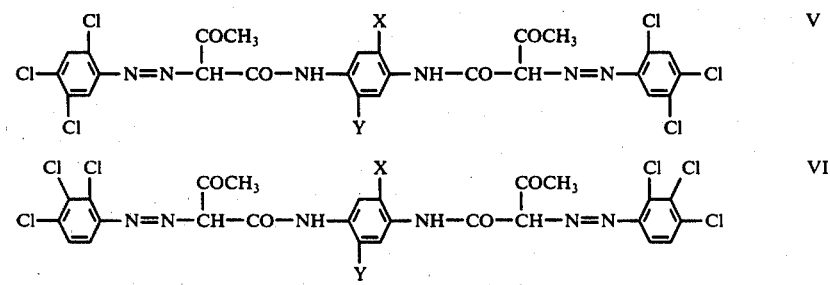

wherein X and Y are as defined above.

As diazo components there may be mentioned 2,3,4-trichloroaniline, 2-methyl-4,5-dichloroaniline and especially 2,4,5-trichloroaniline.

The coupling components are obtained in a simple manner by the action of diketene or ethyl acetoacetate on the corresponding phenylenediamines such as, for example: 1,4-phenylenediamine, 2-chloro-1,4-phenylenediamine, 2-methyl-1,4-phenylenediamine, 2-methoxy-1,4-phenylenediamine, 2,5-dichloro-1,4-phenylenediamine, 2,5-dimethyl-1,4-phenylenediamine, 2-chloro-5-methyl-1,4-phenylenediamine, 2-chloro-5-methoxy-1,4-phenylenediamine, 2-methyl-5-methoxy-1,4-phenylenediamine.

The coupling of the diazo component or of two different components with the coupling component, in the molar ratio of 2 : 1, is preferably carried out in a weakly acid medium, appropriately in the presence of customary agents which promote coupling. As such there may in particular be mentioned dispersing agents, for example aralkylsulphonates, such as dodecylbenzenesulphonate, or 1,1′-dinaphthylmethane-2,2′-disulphonic acid or polycondensation products of alkylene oxides. The dispersion of the coupling component can also advantageously contain protective colloids, for example methyl-cellulose or minor amounts of inert organic solvents which are sparingly soluble or insoluble in water, for example optionally halogenated or nitrated aromatic hydrocarbons such as benzene, toluene, xylene, chlorobenzene, dichlorobenzene or nitrobenzene, as well as aliphatic halogenated hydrocarbons such as, for example, carbon tetrachloride or trichloroethylene, and also organic solvents which are miscible with water, such as acetone, methyl ethyl ketone, methanol, ethanol or isopropanol.

The coupling can also adavantageously be carried out by continuously combining an acid solution of the diazonium salt with an alkaline solution of the coupling component in a mixing nozzle, whereupon immediate coupling of the components takes place. Care must be taken that the diazo component and coupling component should be present in equimolecular amounts in the mixing nozzle and it proves advantageous to use a slight excess of the diazo component. This is most simply effected by monitoring the pH value of the liquid in the mixing nozzle. It is also necessary to ensure vigorous intermixing of the two solutions in the mixing nozzle. The dyestuff dispersion produced is continuously withdrawn from the mixing nozzle and the dyestuff is isolated by filtration.

The coupling can also be carried out by heating a diazoamino compound of the amine to be used as the diazo component with the diacetoacetylarylenediamine in an organic solvent, optionally in an aqueous-organic solvent, preferably in the presence of an acid.

The aryldiazoamino compounds to be used according to the process are obtained according to known processes by coupling an aryldiazonium salt with a primary or, preferably, with a secondary amine. The most diverse amines are suitable for this purpose, for example aliphatic amines, such as methylamine, ethylamine, ethanolamine, propylamine, butylamine, hexylamine and especially dimethylamine, diethylamine, diethanolamine, methyl-ethanolamine, dipropylamine or dibutylamine, aminoacetic acid, methylaminoacetic acid, butylaminoacetic acid, aminoethanesulphonic acid, methylaminoethanesulphonic acid, guanylethanesulphonic acid, β-aminoethylsulphuric acid, aliphatic amines such as chclohexylamine, N-methylcyclohexylamine and dicyclohexylamine, aromatic amines, such as 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-amino-naphthalenesulphonic acid, 1-aminonaphthalene-2,4-disulphonic acid, heterocyclic amines such as piperidine, morpholine, pyrrolidine and dihydroindole and finally also sodium cyanamide or dicyandiamide.

As a rule, the diazoamino compounds obtained are sparingly soluble in cold water and can, if necessary after salting out, be isolated from the reaction medium in a crystalline form. In many cases, the moist press cakes can be used for the further reaction. In some cases it may prove desirable to dehydrate the diazoamides prior to the reaction by vacuum drying, or to remove the warter by azeotropic distillation after suspending the moist press cake in a solvent.

The coupling of the diazoamino compound is carried out in an organic solvent, for example chlorobenzene, o-dichlorobenzene, nitrobenzene, pyridine, ethylene glycol, ethylene glycol monomethyl ether or monoethyl ether, dimethylformamide, N-methylpyrrolidone, formic acid or acetic acid. When using solvents which are miscible with water it is not necessary to use the diazoamino compound in the anhydrous form. For example, the water-moist press cakes can be used. The splitting of the diazoamino compound which precedes the coupling takes place in an acid medium. If neutral solvents are used the addition of an acid, for example hydrogen chloride, sulphuric acid, formic acid, acetic acid, chloroacetic acid or propionic acid, is necessary.

The coupling is appropriately carried out warm, preferably at temperatures of between 80° and 180° C, and generally takes place very rapidly and completely.

Because of their insolubility, the pigments obtained can be isolated from the reaction mixtures by filtration. It proves advantageous to subject the resulting pigments to an aftertreatment with an organic solvent which preferably boils at above 100° C. Instead of the aftertreatment with an organic solvent the filter cake can also be submitted to an aftertreatment in water under pressure at a temperature over 100° C. As organic solvent benzenes substituted by halogen atoms, alkyl or nitro groups, such as xylenes, chlorobenzene, o-dichlorobenzene or nitrobenzene, as well as pyridine bases, such as pyridine, picoline or quinoline, and also ketones, such as cyclohexanone, ethers, such as ethylene glycol monomethyl ether or monoethyl ether, amides, such as dimethylformamide or N-methyl-pyrrolidone, as well as sulphoxone, prove to be particularly suitable.

The after-treatment is preferably carried out by heating the pigment in the solvent to 100° to 150° C, in the course of which an increase in particle size occurs in many cases, and this has a favourable effect on the fastness to light and to migration of the pigments obtained.

Finally, the coupling can also be carried out by suspending the amine to be diazotised, with the coupling component, in the molar ratio of 2:1 in an organic solvent and treating it with a diazotising agent, especially an ester of nitrous acid, such as methyl nitrite, ethyl nitrite, butyl nitrite, amyl nitrite or octyl nitrite.

The new dyestuffs are valuable pigments having excellent fastness properties such as fastness to light, wheather and migration which in a finely divided form can be used for pigmenting high molecular organic material, for example cellulose ethers and esters, polyamides and polyurethanes or poylesters, acetylcellulose, nitrocellulose, natural resins or synthetic resins, such as polymerisation resins or condensation resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile, polyacrylic acid esters, rubber, casein, silicone and silicone resins, individually or as mixtures.

It is immaterial whether the high molecular compounds mentioned are in the form of plastic masses or melts or in the form of spinning solutions, lacquers, paints or printing inks. Depending on the end use, it proves advantageous to use the new pigments as toners or in the form of preparations.

The preparations can, in addition to the pure pigment, for example also contain natural resins, for example abietic acid or its esters, ethylcellulose, cellulose acetobutyrate, alkaline earth metal salts of higher fatty acids, fatty amines, for example stearylamine or rosin amine, vinyl chloride-vinyl acetate copolymers, or polyacrylonitrile or polyterpene resins or water-soluble dyestuffs, for example dyestuff-sulphonic acids or their alkaline earth metal salts.

In the examples which follow the parts, unless otherwise indicated, denote parts by weight and the percentages denote percentages by weight.

EXAMPLE 1

17.3 parts of 2,4,5-trichloro-aniline in 300 parts by volume of glacial acetic acid are stirred with 25 parts by volume of concentrated hydrochloric acid, in the course of which the hydrochloride of the base is formed. The mixture is then cooled to −5° C by adding 300 parts of ice and diazotisation is carried out by adding 24 parts by volume of 4 N sodium nitrite. The yellow diazo solution is stirred at 0° to 5° C until only traces of nitrous acid are still detectable. The diazo solution is then clarified by filtration, with addition of a little decolourising charcoal. The filtrate is brought to pH 4 by adding 48 parts of anhydrous crystalline sodium acetate.

At the same time, 14.5 parts of 2-methyl-5-chloro-1,4-bisacetoacetylaminobenzene and 12 parts by volume of 40% strength sodium hydroxide solution are dissolved in 800 parts of water and 5 parts of n-butylsulphoricinoleate are added. This solution is clarified by filtration with 0.5 part of decolourising charcoal and is then added dropwise over the course of 1 to 1½ hours to the diazo solution, with good stirring. In the course thereof, the temperature of the reaction mixture rises to 15°–20° C. After completion of the dropwise addition, diazo compound is no longer detectable in the mixture. The mixture is stirred for one hour at room temperature and is then warmed to 80°–85° C over the course of 1 hour and filtered hot, and the product is washed with hot water until free of salt. After drying in vacuo at 95° to 100° C, 26.2 parts of a yellow dyestuff of the formula

VII form. Fine bunched yellow small needles of length 1 to 3 μ are detectable under the microscope. The product is filtered off at 160° C and washed with hot dimethylformamide until the filtrate issues light yellow, the dimethylformamide is then displaced by cellosolve until it issues colourless and finally the product is again washed with ethanol. After drying, 18 parts of a luminous yellow pigment dyestuff are obtained. It dyes plastics, such as PVC, in greenish-tinged yellow shades of excellent fastness to migration. The treatment in the organic solvent can also be carried out directly with the moist filter cake without prior drying. Thus it is possible to stir the moist press cake in picoline at 100° to 120° C, filter the mixture and wash the product with methanol and subsequently with dilute hydrochloric acid, or to stir the moist press cake in chlorobenzene, dimethylformamide or nitrobenzene and free it of water by azeotropic distillation and then work it up as described above.

Table I which follows describes further dyestuffs which are obtained by coupling the diazotised bases of column I with the bis-acetoacetic acid arylides of the diamines of column II. Column III indicates the colour shade of a PVC film coloured with 0.2% of these pigments.

TABLE I

| Example No. | Diazo base | Bis-acetoacetyl compound of the diamine | 0.2% Colouration in PVC |
|---|---|---|---|
| 2 | 2,4,5-Trichloro-aniline | 1,4-Phenylenediamine | Light yellow |
| 3 | 2,4,5-Trichloro-aniline | 2-Chloro-1,4-phenylenediamine | Yellow |
| 4 | 2,4,5-Trichloro-aniline | 2-Methyl-1,4-phenylenediamine | Yellow |
| 5 | 2,4,5-Trichloro-aniline | 2-Methoxy-1,4-phenylenediamine | Yellow |
| 6 | 2,4,5-Trichloro-aniline | 2,5-Dichloro-1,4-phenylenediamine | Yellow |
| 7 | 2,4,5-Trichloro-aniline | 2-Chloro-5-methoxy-1,4-phenylenediamine | Yellow |
| 8 | 2,4,5-Trichloro-aniline | 2,5-Dimethyl-1,4-phenylenediamine | Yellow |
| 9 | 2,4,5-Trichloro-aniline | 2-Methoxy-5-methyl-1,4-phenylenediamine | Yellow |
| 10 | 2,4,5-Trichloro-aniline | 2,5-Dichloro-1,3-phenylenediamine | Yellow |
| 11 | 2,3,4-Trichloro-aniline | 1,4-Phenylenediamine | Yellow |
| 12 | 2,3,4-Trichloro-aniline | 2-Chloro-1,4-phenylenediamine | Yellow |
| 13 | 2,3,4-Trichloro-aniline | 2-Methyl-1,4-phenylenediamine | Reddish-tinged yellow |
| 14 | 2,3,4-Trichloro-aniline | 2-Methoxy-1,4-pheylenediamine | Reddish-tinged yellow |
| 15 | 2,3,4-Trichloroaniline | 2,5-Dichloro-1,4-phenylenediamine | Greenish-tinged yellow |
| 16 | 2,3,4-Trichloro-aniline | 2-Chloro-5-methoxy-1,4-phenylenediamine | Greenish-tinged yellow |
| 17 | 2,3,4-Trichloro-aniline | 2,5-Dimethyl-1,4-phenylenediamine | Reddish-tinged yellow |
| 18 | 2,3,4-Trichloro-aniline | 2-Methoxy-5-methyl-1,4-phenylenediamine | Reddish-tinged yellow |
| 19 | 2-Methyl-4,5-dichloro-aniline | 1,4-Phenylenediamine | Yellow |
| 20 | 2-Methyl-4,5-dichloro-aniline | 2-Chloro-1,4-phenylenediamine | Yellow |
| 21 | 2-Methyl-4,5-dichloro-aniline | 2,5-Dichloro-1,4-phenylenediamine | Yellow |
| 22 | 2-Methyl-4,5-dichloro-aniline | 2-Methyl-1,4-phenylenediamine | Yellow |
| 23 | 2-Methyl-4,5-dichloro-aniline | 2-Chloro-5-methyl-1,4-phenylenediamine | Yellow |
| 24 | 2-Methyl-4,5-dichloro-aniline | 2,5-Dimethyl-1,4-phenylenediamine | Reddish-tinged yellow |
| 25 | 2-Methyl-4,5-dichloro-aniline | 2-Methoxy-1,4-phenylenediamine | Reddish-tinged yellow |
| 26 | 2-Methyl-4,5-dichloro-aniline | 2-Chloro-5-methoxy-1,4-phenylenediamine | Yellow |
| 27 | 2-Methyl-4,5-dichloro-aniline | 2-Methyl-5-methoxy-1,4-phenylenediamine | Reddish-tinged yellow |

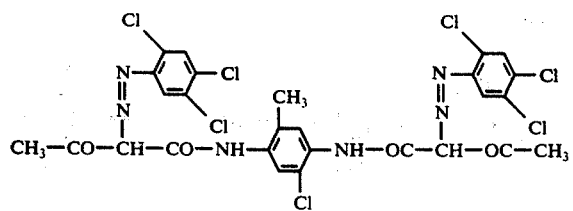

are obtained.

20 parts of the pigment thus obtained are stirred into 600 parts by volume of dimethylformamide over the course of 12 hours at 160° to 170° C. In the course thereof, the dyestuff assumes a homogeneous crystalline

EXAMPLE 28

17.3 parts of 2,4,5-trichloro-aniline and 13 parts of 2-methyl-5-chloro-1,4-bis-acetoacetylaminobenzene are suspended, at room temperature, in a mixture of 400 parts by volume of dimethylformamide and 100 parts by volume of glacial acetic acid. 60 parts of volume of n-butyl nitrite, dissolved as a 2 N solution in o-dichlorobenzene, are now slowly added to the above solution.

Hereupon, a yellowish-tinged solution is immediately produced and the temperature slowly rises to 35°C. After completion of the dropwise addition, the mixture is stirred for a further 15 hours at room temperature, finally resulting in a yellow suspension. Yellow fine amorphous aggregates of 5 to 10 μ size are detectable under the microscope.

Thereafter the product is filtered off and washed with hot dimethyformamide until the filtrate issues still slightly coloured. The filter residue is thereafter eluted with a little ethanol and a little hot water. The filter residue is dried in vacuo at 70°C, giving a yield of 18.3 parts of a yellow pigment dyestuff.

To improve the form, 17 parts of this pigment are now stirred in 500 parts by volume of nitrobenzene. Thereafter the mixture is warmed to 160° C and stirred for approx. a further 5 hours at this temperature. This produces a fine yellow suspension and yellow crystalline aggregates of 5 to 10 μ size can be seen under the microscope.

Thereafter the mixture is filtered at 160° C and the product is washed with hot dimethylformamide until the filtrate which issues is still slightly coloured. Thereafter, the filter residue is additionally rinsed with a little ethanol and dried in vacuo at 70° C.

A yield of 14 parts of a yellow pigment dyestuff is obtained.

EXAMPLE 29

65 parts of stabilised polyvinyl chloride, 35 parts of dioctyl phthalate and 0.2 part of the dyestuff obtained according to Example 1 are stirred together and then milled for 7 minutes at 140° C on a twin-bowl calender. A yellow-coloured film of very good fastness to light and to migration is obtained.

EXAMPLE 30 (Mixed coupling)

27.85 parts of 2,4,5,-trichloroaniline and 1.33 parts of anthranilic acid in 150 parts by volume of glacial acetic acid are stirred with 50 parts by volume of concentrated hydrochloric acid and the mixture is cooled to 5° C. It is then cooled to −5° C by adding 200 parts of ice and diazotisation is carried out with 50 parts by volume of 4 N sodium nitrate. After stirring for 30 minutes at 0°–5° C the excess of nitrous acid is destroyed with sulphamic acid and the diazo solution is clarified by filtration, with addition of decolourising charcoal. The clear diazo solution is adjusted to pH 4 by adding 60 parts of cyrstalline sodium acetate.

At the same time, 32.5 parts of 2-methyl-5-chloro-1,4-bisacetoacetylaminobenzene and 25 parts by volume of 40% strength sodium hydroxide solution are dissolved in 1,000 parts of water and 7.5 parts of n-butylsulphoricinoleate are added. This solution is clarified by filtration with 1.5 parts of decolourising charcoal and is then added dropwise over the course of 1½ to 2 hours to the diazo solution, with vigorous stirring. In the course thereof, the temperature of the reaction mixture rises to 15° –20° C. After completion of the dropwise addition, diazo compound is no longer detectable in the mixture. The mixture is stirred for one hour at room temperature and is then warmed to 90° –95° C over the course of 1 hour, stirred for a further hour at this temperature and filtered hot, and the product is washed with hot water until the filtrate is neutral and free of salt. After drying at 90° –95° C in vacuo, 70.5 parts of a yellow pigment dyestuff are obtained.

The dyestuff obtained is this manner shows, in gravure printing, a substantially increased colour strength and better viscosity characteristics as compared to the pigment manufactured according to Example 1.

We claim:

1. A disazo pigment of the formula

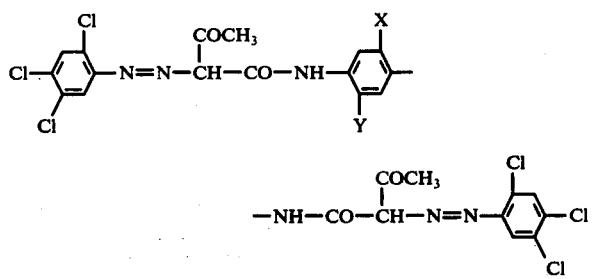

wherein X and Y are hydrogen, chlorine or methyl and one of X and Y may be methoxy.

2. A disazo pigment according to claim 1 of the formula

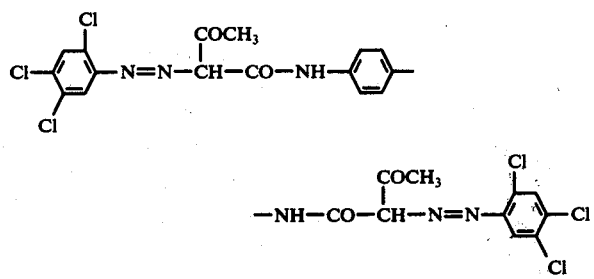

3. A disazo pigment according to claim 1 of the formula

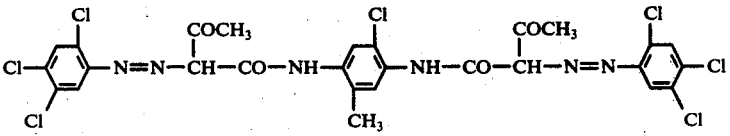

4. A disazo pigment according to claim 1 of the formula

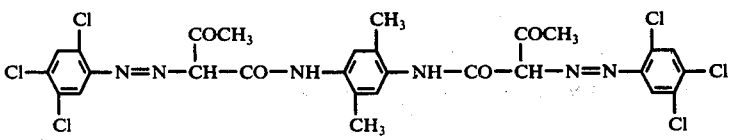

* * * * *